March 23, 1954
F. L. SALISBURY
2,673,233
COAXIAL LINE COUPLING
Original Filed March 31, 1943
5 Sheets-Sheet 1
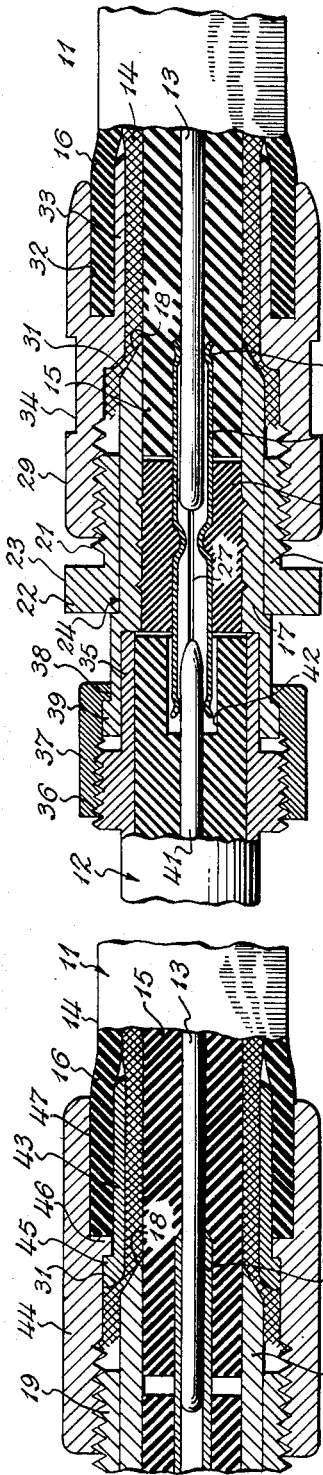
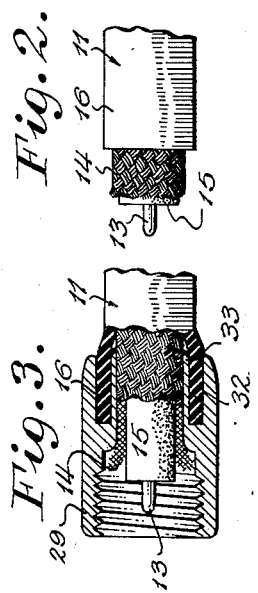
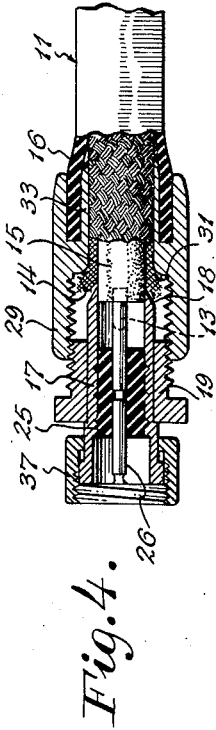
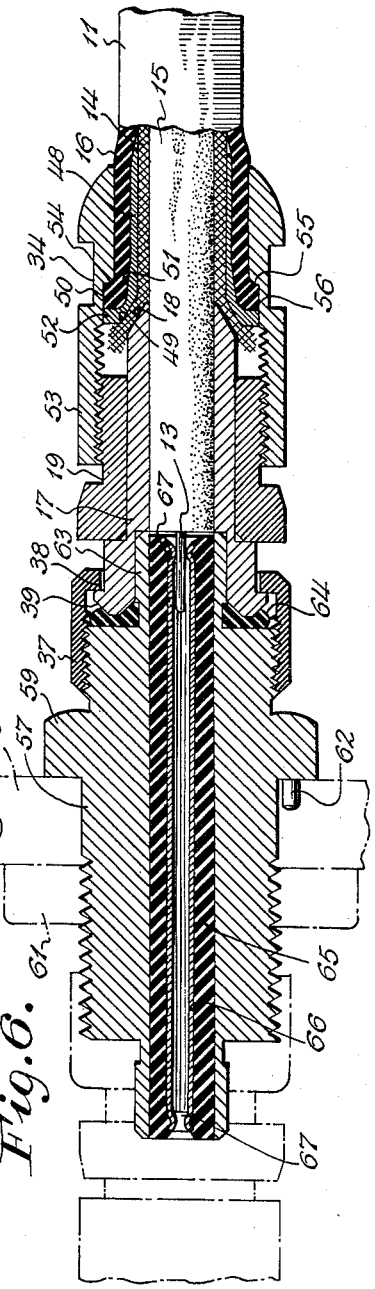
INVENTOR
FREDERICK L. SALISBURY
BY
Thomas M. Ferrill, Jr.
ATTORNEY

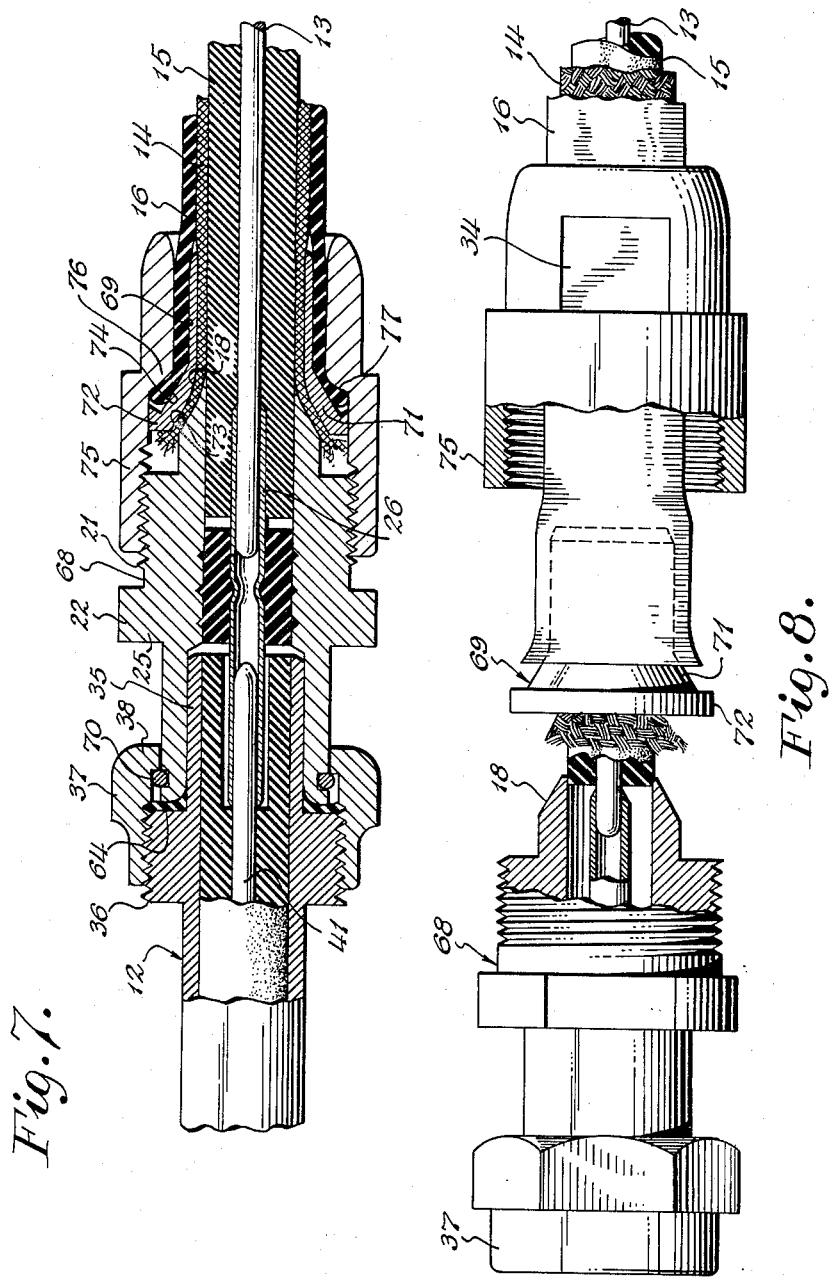

March 23, 1954   F. L. SALISBURY   2,673,233
COAXIAL LINE COUPLING
Original Filed March 31, 1943   5 Sheets-Sheet 3
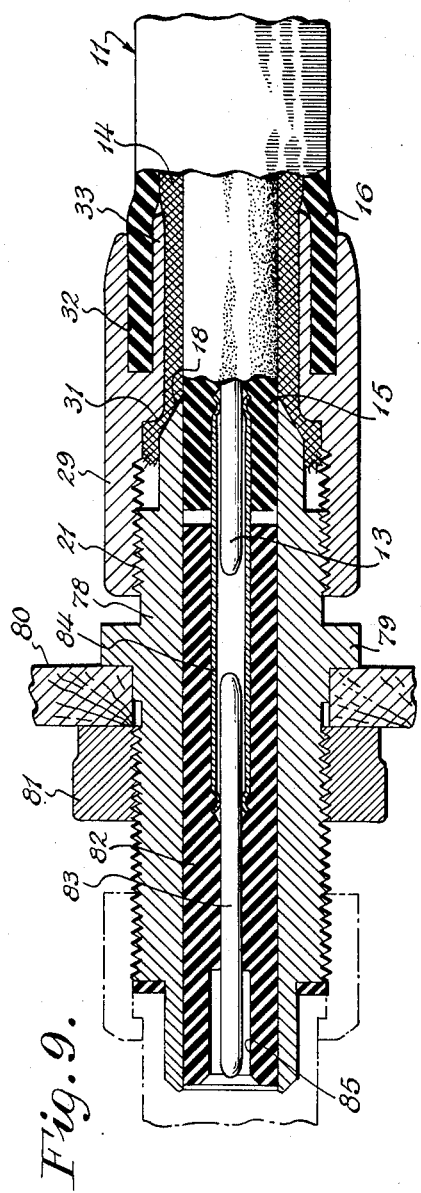
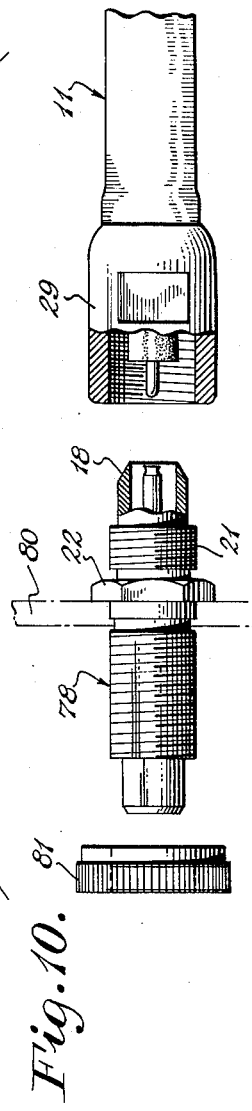
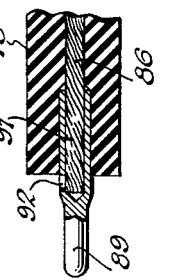
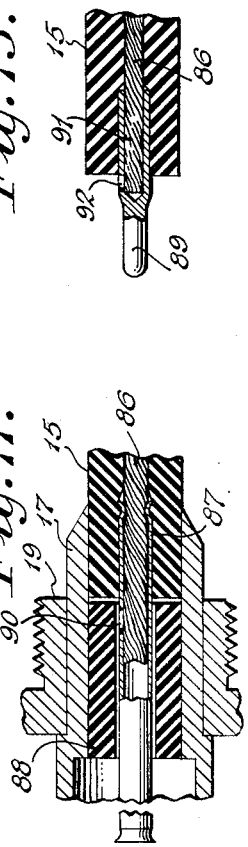
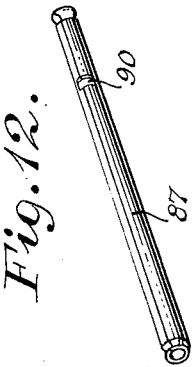
INVENTOR
FREDERICK L. SALISBURY
BY Thomas M. Ferrill Jr.
ATTORNEY March 23, 1954 F. L. SALISBURY 2,673,233
COAXIAL LINE COUPLING
Original Filed March 31, 1943 5 Sheets-Sheet 4
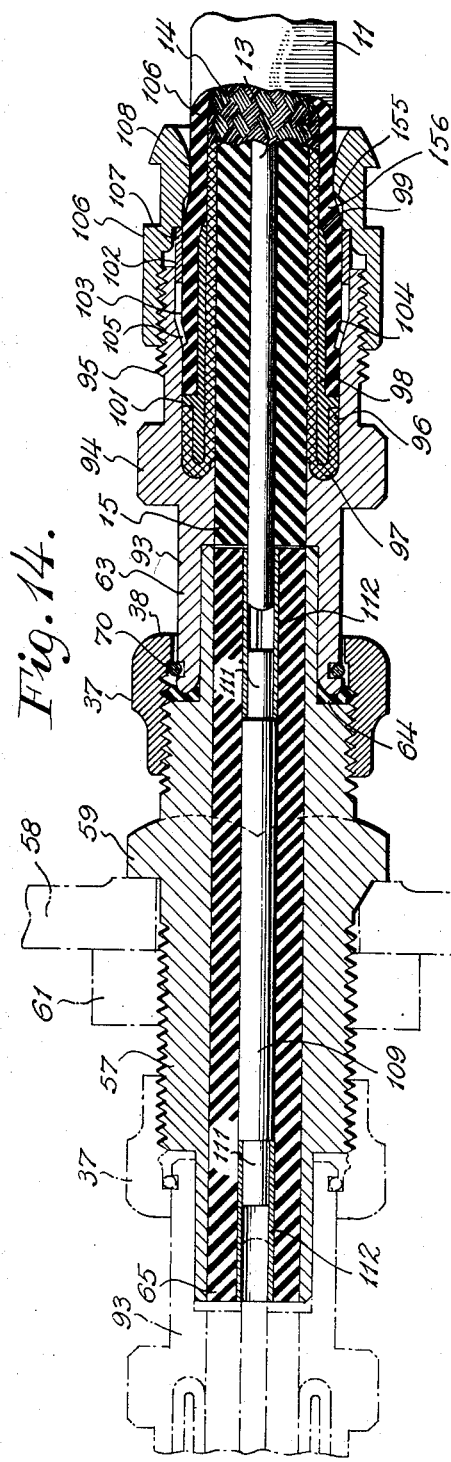
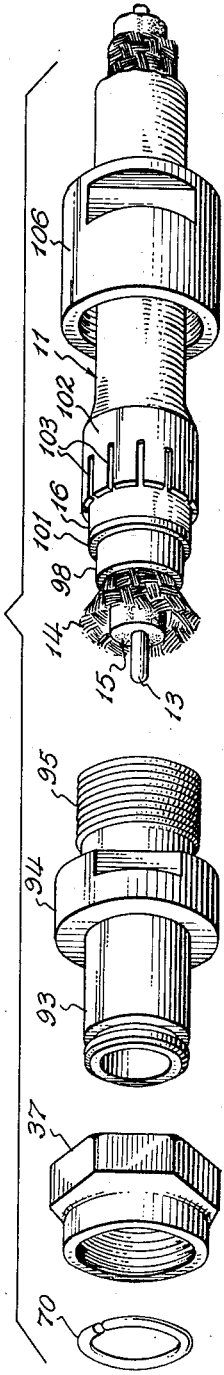
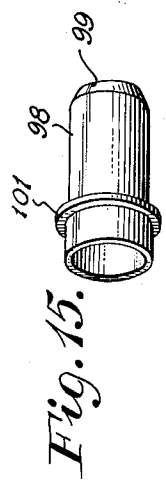
INVENTOR
FREDERICK L. SALISBURY
BY
Thomas M. Ferrill, Jr.
ATTORNEY March 23, 1954
F. L. SALISBURY
2,673,233
COAXIAL LINE COUPLING
Original Filed March 31, 1943
5 Sheets-Sheet 5
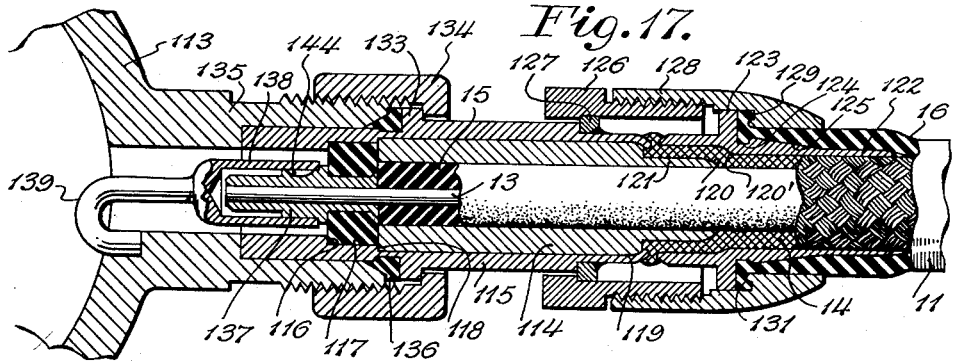
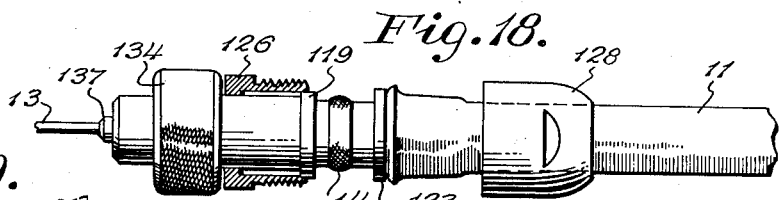
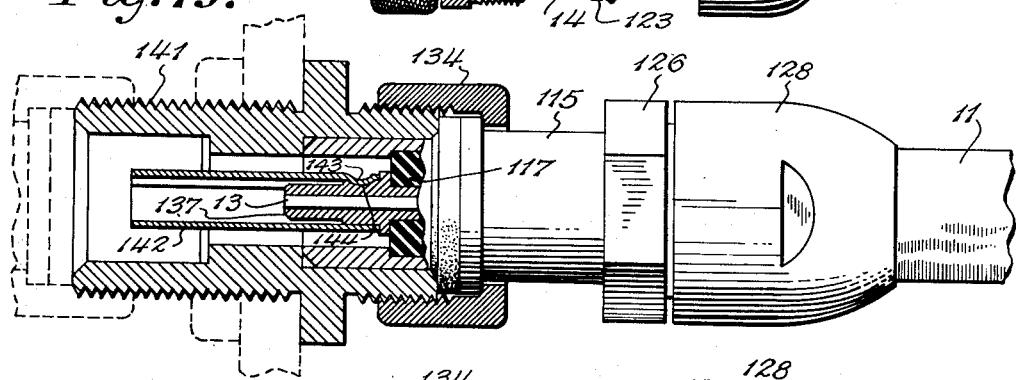
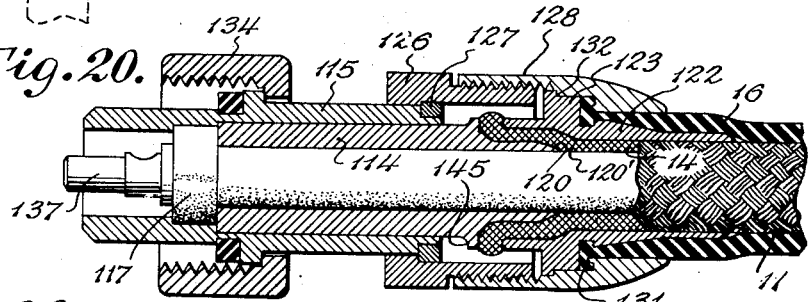
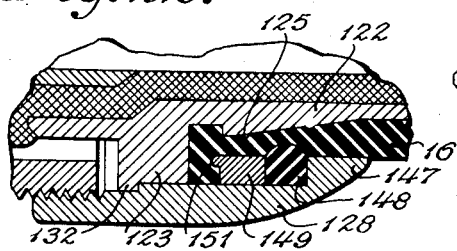
INVENTOR
FREDERICK L. SALISBURY
BY
Thomas M. Ferrill Jr.
ATTORNEY Patented Mar. 23, 1954

2,673,233

UNITED STATES PATENT OFFICE 2,673,233

COAXIAL LINE COUPLING

Frederick L. Salisbury, Lynbrook, N. Y., assignor to The Sperry Corporation, a corporation of Delaware Original application March 31, 1943, Serial No. 481,359, now Patent No. 2,425,834, dated August 19, 1947. Divided and this application January 8, 1947, Serial No. 720,764

7 Claims. (Cl. 174—88)

My invention relates to electrical transmission lines and is particularly concerned with coupling construction for coaxial conductor transmission lines.

The present application is a division of my prior application Serial No. 481,359 filed March 31, 1943, which issued as U. S. Patent No. 2,425,834, dated August 19, 1947.

Flexible and rigid coaxial conductor transmission lines of good characteristics have been recently developed for handling ultra high frequency energy. The attendant problem of coupling such lines to each other or to rigid instrument fittings has proved difficult. Several types of couplings for this purpose have already been designed to my knowledge but most of these are rather cumbersome and complicated mechanically and usually inefficient electrically.

Hence it is a major object of the invention to provide novel couplings for coaxial conductor transmission lines, which couplings are mechanically simple and efficient, easy to attach to the line, and of good electrical efficiency.

A further object of the invention is to provide a novel coupling clamp construction for securely attaching the end of a coaxial conductor flexible transmission line to a coupling.

It is a further object of the invention to provide novel coupling arrangements for attaching a flexible coaxial conductor transmission line to various terminal fittings such as through-panel fittings, tube output terminals and the like.

A further object of the invention is to provide a novel coupling construction for attachment to a coaxial conductor flexible transmission line wherein the coupling embodies an expansion chamber for receiving the end of the outer insulation covering of said line.

A further object of the invention is to provide a novel coaxial line coupling capable of easy and speedy assembly to a coaxial line under field conditions.

Further objects of the invention will presently appear as the description proceeds in connection with the appended claims and the annexed drawings wherein:

Fig. 1 is mainly a section through the axis of a flexible coaxial line and coupling embodying a preferred form of the invention;

Figs. 2, 3 and 4 are sectional views illustrating successive assembly steps in attaching the flexible coaxial line to the coupling members in Fig. 1;

Fig. 5 is mainly a section through the flexible cable clamping section of a coupling similar to that of Fig. 1 but having an independent outer clamp member;

Fig. 6 is mainly a section through the axis of a heavy duty flexible coaxial line and coupling assembly comprising a further embodiment of the invention and employed with a through-panel fitting;

Fig. 7 is a section illustrating a flexible coaxial line and coupling assembly comprising a further embodiment of the invention employing certain coupling features of Fig. 1 and clamp coupling features of Fig. 6;

Fig. 8 is an exploded view, partly in section, illustrating the manner of assembly of the flexible line and coupling in Fig. 6 or 7;

Fig. 9 is an axial section through a coaxial line and coupling assembly of further embodiment of the invention, employing a simple form of through-panel fitting;

Fig. 10 is an exploded view, partly in section, illustrating the manner of assembly of the structure of Fig. 9;

Fig. 11 is an axial section through a coupling and coaxial line assembly having a stranded inner conductor;

Fig. 12 is a perspective view illustrating the female tip attachment member for the stranded inner conductor of Fig. 11;

Fig. 13 is a fragmentary view, partly in axial section, illustrating a male tip attachment on the stranded inner conductor;

Fig. 14 is mainly an axial section illustrating a different embodiment of the flexible coaxial line and coupling assembly of the invention;

Fig. 15 is substantially a perspective view showing the clamp sleeve to be inserted between the outer insulation and the outer conductor in the assembly of Fig. 14;

Fig. 16 is an exploded view showing the manner of assembly of the parts of Fig. 14;

Fig. 17 is an axial section through a coupling illustrating a further embodiment of the invention, illustrated as attaching a flexible coaxial line to a rigid coaxial terminal;

Fig. 18 is an exploded view illustrating the manner of assembly of the coupling of Fig. 17;

Fig. 19 is an axial section illustrating the coupling of Fig. 17 used with a through-panel fitting;

Fig. 20 is an axial section through a coupling generally similar to that of Fig. 17 but of slightly different details in construction;

Fig. 21 is a fragmentary section illustrating an optional form of inner conductor tip which may be used in the coupling of Fig. 20; and Fig. 22 is a fragmentary section illustrating the couplings of Figs. 17 and 20 embodying a modified holding member.

Referring to Fig. 1, therein is illustrated a coupling between a flexible coaxial conductor transmission line 11 and a rigid coaxial line terminal 12. Line 11 comprises a solid wire inner conductor 13 sufficiently small in diameter to be readily flexible, a coaxial outer conductor 14 which may be a braided metal tubular sheath as shown, continuous tubular insulation 15 occupying the space between the inner and outer conductors, and an outer insulating covering 16 which may be of rubber, neoprene or some rubber-like material as shown. Where the cable is flexible, insulation 15 is of elastic material having the required dielectric properties.

The coupling comprises a tubular metal member 17 having at one end an inclined annular relatively short clamping face 18 projecting between outer conductor 14 and insulation 15 so as to flare the former outwardly as illustrated. Face 18 is preferably inclined at an angle of about 30° with the line axis for best practical results, although the angle may vary between 20° and 45° for different purposes. In any event, the angle should be large enough so that face 18 need enter only a short distance within the outer conductor to obtain full contact, and so that the outer conductor is flared outwardly enough to be gripped by axially directed clamping forces. An annular collar 19, which surrounds member 17, is formed with an external thread 21 and an enlarged flange 22 having its periphery 23 formed to fit a wrench. Collar 19 is permanently fastened to member 17, as by soldering at common surfaces 24, so that collar 19 and member 17 effectively comprise a rigid coupling body.

Internally, member 17 contains an insulator block 25 centrally apertured to accommodate a small hollow metal tube 26 which projects therefrom at opposite ends. Block 25 is preferably of non-yielding dielectric material rigid with member 17, and tube 26 is rigid with block 25. Tube 26 is longitudinally split as at 27, so as to provide expansible inner conductor sockets at opposite ends of member 17, and is formed adjacent opposite ends with annular dimples 28 which provide tight electrical contact between tube 26 and inner conductor 13 in the assembly.

The coupling also comprises a holding member or nut 29 which is internally threaded at one end so as to fit with threads 21 and be rotatably adjustable on annular collar 19. Internally, holding member 29 is formed with an annular clamping face 31 for engaging the outer conductor opposite face 18 of the body member. As illustrated, face 31 is preferably arcuate so as to provide a narrow contact region wherein the outer conductor is tightly clamped when holding member 29 is drawn tight. This arrangement provides a higher pressure connection than can be obtained between two parallel inclined clamp faces for example, and has no sharp edges to injure or sever the conductor wires. If desired, the rounded clamp face may be on member 17 and the inclined clamp face on nut 29.

Beyond its clamping face, holding member 29 is formed with a relatively deep annular groove 32 for receiving the free end of insulator covering 16. This effectively provides a relatively narrow collar 33 integral with member 29 projecting between outer conductor 14 and the insulator covering. Holding member 29 is formed also with an external wrench fitting region indicated at 34.

Rigid line 12, which is substantially the usual rigid coaxial terminal provided on cavity resonator electron discharge tubes, comprises an outer conductor tube 35 having an externally threaded section 36 near its end. Conductor 35 fits telescopingly within body member 17 as illustrated. A nut 37, internally threaded so as to fit the threads of section 36, has an inwardly turned radial flange 38 cooperable with radial flange 39 on the end of member 17, so that conductor 35 and the coupling body are drawn into secure contact when nut 37 is tightened. Nut 37 is mounted on member 17 before collar 19 is soldered into place.

Inner conductor 41 of the rigid line telescopes within the adjacent end of tube 26 similarly to conductor 13, so that tube 26 interconnects the inner line conductors. If the insulation between the conductors within the rigid line extends to the end of the line as shown, it can be formed with a suitable recess 42 for freely receiving the end of tube 26.

Assembly of the flexible line and coupling of Fig. 1 is shown in Figs. 2–4. First, the flexible line is cut away substantially as shown in Fig. 2. Then holding member 29 is mounted on the line by inserting collar 33 between the outer conductor 14 and insulation 16, and guiding insulation 16 into recess 32. Braided conductor 14 is then flared to accommodate the end of member 17. Member 17, with nut 37 thereon, is telescoped with insulator sleeve 15 as illustrated in Fig. 4 so that face 18 advances between the outer conductor 14 and sleeve 15, and inner conductor 13 enters tube 26. Tube 26 slips readily between sleeve 15 and inner conductor 13 because of the elasticity of insulation 15. At the same time holding member 29 is threadedly engaged with the coupling body, and when member 29 is drawn tight the parts appear as in Fig. 1 with the inner line conductor in tight frictional contact with tube 26 and the outer line conductor securely clamped between the body and holding members.

Preferably the parts are so dimensioned that the inner diameters of conductor 35, member 17 and conductor 14 are equal. Also tube 26 is of thin metal so that it provides no appreciable change in conductor diameter between conductors 13 and 41 which are of the same size. Also the various dielectric members within the body and lines are preferably dimensioned to provide a substantially continuous unchanging dielectric within the lines and coupling.

The coupling assembly shown in Fig. 5 is the same as that of Fig. 1, except that holding member 29 of Fig. 1 is replaced by separable thimble and nut members 43 and 44, respectively, performing substantially the same function. Thimble 43 is a thin conductive cylinder having a tapered end adapted to be inserted between the outer conductor 14 and insulation 16. The other end of thimble 43 is formed with clamping face 31, similar to that in Fig. 1, and an external annular radial flange 45 cooperating with an internal radial annular flange 46 on nut 44.

The free end of insulation 16 is received within the recess defined by an internal shoulder 47 on nut 44 and the outer surface of thimble 43. Nut 44 is threaded to member 17 at collar 19 and when drawn tight securely clamps the outer conductor between faces 18 and 31, and the parts are interrelated as in Fig. 1.

Fig. 6 illustrates the invention as embodying a heavy duty coupling applied to a separate through-panel connection between two flexible coaxial lines. Coupling member 17 and collar 19 are rigid as in Fig. 1 although of slightly different dimensions. As in Fig. 5, the flexible line is clamped to the body by two separable parts. A relatively thin cylindrical thimble 48 is inserted between outer conductor 14 and insulation 16. Thimble 48 is formed with an internal annular inclined clamping face 49 opposite face 18, an external inclined annular clamping face 51 contacting the inner periphery of insulation 16, and an external annular radial flange 52. Face 49 is preferably inclined to the line axis a few degrees more than face 18 to provide a relatively narrow annular high pressure clamp region.

Holding nut 53, which is threaded to member 19 as in Fig. 1, is formed with an internal shoulder 54 and a rounded internal annular clamping face 55. Shoulder 54, flange 52 and part of face 51 define an annular expansion space 56 for receiving the free end of insulation 16. With the parts assembled as shown, when nut 53 is drawn tight, conductor 14 is clamped between thimble 48 and member 17, and insulation 16 is clamped between thimble 48 and nut 53. Cooperating clamping faces 51 and 55 squeeze the region of insulation 16 between them, and expansion chamber 56 is sufficiently large to accommodate flow of rubber or other insulation material from that region so that insulation 16 becomes terminated in an enlarged substantially annular rim 50 within the expansion space. This rim aids in resisting longitudinal pulls tending to separate the flexible line and coupling. Since the usual rubber containing or rubber-like material of which insulation 16 is generally comprised flows readily and becomes substantially set in shape after having been clamped for a short time, rim 50 becomes more effective for this purpose during the life of the coupling. Flange 52 prevents the insulation from interfering with the threaded connection between the holding member and body.

In Fig. 6, member 17 contains no central insulator block or hollow conductor as in Fig. 1. Instead, a sufficient length of line 11 is bared down to insulation 15 to permit central conductor 13 and insulation 15 to project a considerable distance into member 17, conductor 13 telescoping within hollow conductor tube 66 to continue through the coupling.

Rigid fitting 57 extends through mounting panel 58 and is clamped to the panel by means of a radial flange 59 and a nut 61. A pin 62, projecting within a suitable panel recess, prevents rotation of the fitting. Fitting 57 is formed with a reduced integral extension 63 telescoping with member 17 of the coupling, and a flexible sealing washer 64 is compressed between abutting surfaces of the fitting and body. Nut 37 secures the coupling to the fitting in the same fashion that the coupling and terminal are secured together in Fig. 1.

Internally, fitting 57 contains a rigid insulating sleeve 65 in which is imbedded a hollow conductor tube 66 having spring terminals 67 for receiving conductor 13. Sleeve 65 preferably terminates about even with extension 63 and in substantial abutment with the end of insulation 15.

As indicated in dotted lines in Fig. 6, the fitting may have a coupling of the same construction at each end, on opposite sides of the panel.

Fig. 7 illustrates a heavy duty coupling similar to that of Fig. 6 used between a flexible line and a rigid coaxial terminal such as in Fig. 1. Body 68, which corresponds to an integral combination of parts 17 and 19 of Fig. 1, is formed with wrench attaching flange 22, threaded portion 21 and inclined clamping face 18. In this form of the invention, nut 37 is held on the body by a resilient snap ring and groove assembly at 70.

A tubular thimble 69 is inserted between the outer conductor and insulation 16, and is formed with an outwardly inclined annular flange 71 terminating in an external annular radial flange 72. Flange 71 is formed with a conductor clamp face 73 and an insulator clamp face 74, both inclined to the line axis. The angle of inclination of face 73 is slightly larger than that of face 18 to provide a narrow high pressure clamp region, as in Fig. 6. If desired face 73 may be arcuate, similar to face 31 in Fig. 1. Holding member or nut 75 is threaded on body 68 and is internally shouldered at 76 to provide an arcuate insulator clamping face 77.

When nut 75 is tightened, conductor 14 is clamped between body 68 and thimble 69 and insulation 16 is clamped between thimble 69 and nut 75. As in Fig. 6, the shouldered and associated flange constructions of nut 75 and thimble 69 provide an expansion space for receiving the end of insulation 16. The coupling is secured to terminal 12 as in Fig. 1.

Fig. 8 shows the preferred manner of assembly of flexible lines with a coupling such as those of Figs. 6 and 7. Holding nut 75 is slipped over the prepared cable end prior to insertion of thimbles 69 or 48. The parts are then assembled much as explained above in connection with Fig. 4, nut 75 being now slipped forward into threaded engagement with the body member.

Referring now to Figs. 9 and 10, an elongated body 78 which also serves as a through-panel fitting is formed with an integral panel engaging flange 79, threaded section 21 and inclined annular clamp face 18. By means of holding member 29, outer conductor 14 is clamped to the body 78 similarly to Fig. 1.

Body 78 extends through a suitable aperture in mounting panel 80 and is threaded beyond the panel for mounting a nut 81 which when tightened secures the body to the panel. Within body 78 is an insulating sleeve 82 in which is mounted a section of solid conductor 83. A female connection to inner conductor 13 of line 11 is provided by a tube 84 extending through sleeve 82 and telescoped at opposite ends with conductors 13 and 83. Tube 84 has resilient end fingers providing good electrical contact. Sleeve 82, conductor 83 and tube 84 are mounted in body 78 in the factory, conductor 83 being molded within body 78.

A male connection is provided by conductor 83 at the other end of body 78, the insulation being recessed at 85 to receive a female connection. If desired, of course, the body could be provided with female connectors at both ends simply by extending tube 84. Also, if desired, holding member 29 could be replaced by the heavy duty separate holding nut and clamp collar elements of Figs. 6 and 7.

An advantage of the above construction is that it eliminates the need for separate coupling and through-panel fitting devices, thus saving an extra part in many installations.

Fig. 11 illustrates an adaptation of the coupling of Fig. 1 for stranded center conductor flexible lines. The end of stranded center conductor 86 is advanced within a split hollow conductor tube 87 which is advanced until part of the tube is well between the conductor and insulator sleeve 15. Then solder is introduced through a suitable aperture 90 in the tube to make tube 87 a rigid extension of conductor 86. In this form of the invention, the insulator block 88 within the body member has a central bore large enough to allow free passage of tube 87, and tube 87 functions similarly to tube 26 in Fig. 1 for providing connection to the center conductor of a terminal or the like at the other end of the coupling. Of course, tube 87 may be soldered to a solid inner conductor line where a female terminal is desired.

Fig. 13 illustrates a male end connector for a stranded center conductor line, which may also be used in the invention. This connector has a solid section 89 shaped like the usual solid wire inner conductor, and a hollow end socket 91 into which the stranded conductor end is threaded. Solder is introduced at aperture 92 to fasten the connector to the conductor.

The arrangements of Figs. 11–13 can be employed for adapting stranded center conductor lines to any of the earlier described embodiments of the invention herein.

Figs. 14–16 illustrate a further form of coupling for attaching a flexible coaxial line to a through-panel fitting. A coupling or tubular body 93 is formed with a wrench applying flange 94 and a threaded end section 95. Adjacent the flexible line, body 93 is formed with an enlarged bore 96 and an annular generally concave shoulder 97 facing outwardly of the bore.

The outer conductor 14 is surrounded within the coupling by a thin cylindrical thimble 98 having a tapered end 99 for ease in insertion between the outer conductor and insulation 16 and having an external radial flange 101 abutting the end of insulation 16. As shown in Fig. 14, outer conductor 14 projects through thimble 98 and is folded back externally about the sleeve so as to be clamped inwardly of flange 101, so as to be clamped through a relatively narrow annular high pressure region between the inner end of thimble 98 and arcuate shoulder 97.

An insulation clamp collar 102 surrounds the insulation 16 at least partially coextensively with thimble 98. Collar 102 is formed with a number of longitudinal slots 103 at its inner end to provide a resilient section capable of circumferential contraction. The inner peripheral end of collar 102 is contacted by an internal annular tapered face 104 in bore 96, which contracts the collar to form a restricted section 105 gripping and partly imbedded in a portion of the free end of insulation 16.

A holding nut 106, threaded on body section 95, is formed with an internal shoulder 107 engaging the outer end of collar 102 and is formed beyond the clamping sleeves with a throat 108 having a sliding fit with the flexible line.

Between the throat 108 and the shoulder 107 the bore in the holding nut 106 is made larger than the normal outside diameter of the insulation 16, to provide a tapered internal annular face 155 and an annular expansion space 156.

Fig. 16 illustrates the manner of assembly of the coupling and flexible line. Line 11 is first prepared as in Fig. 2 to bare the necessary lengths of inner and outer conductors. Then nut 106 is slipped over the line end prior to insertion of thimble 98 between outer conductor 14 and insulation 16. Collar 102 is then slipped over the line so that the coupling parts are arranged as shown in the right side of Fig. 16. Conductor 14 is folded back over thimble 98, as above explained, and the line end is inserted into body 93 until solid contact is made with shoulder 97. Holding nut 106 is moved up and tightened to draw the parts into the position shown in Fig. 14.

As nut 106 is drawn tight, shoulder 107 shifts collar 102 toward shoulder 97, and face 104 serves to contract the end of collar 102 and force it into insulation 16. This effectively clamps the holding nut to insulation 16. Since insulation 16 abuts shoulder 101 and throat 108 is restricted as compared to the line diameter within the coupling, tightening of nut 106 also results in thimble 98 being urged and maintained solidly against shoulder 97. As in Fig. 6, insulation 15 provides the inter-conductor insulation within the coupling body.

Through-panel fitting 57 has substantially the same outer conductor connection as in Fig. 6, and fits telescopingly with body 93 as illustrated, flange 38 of nut 37 cooperating with snap ring 70 seated in a groove on the body as in Fig. 7.

Insulator sleeve 65 contains a centrally imbedded solid conductor 109 having reduced end 111 on which are telescoped short split tubes 112 having the same outer diameter as conductor 109. Each tube 112 forms a resilient socket for frictionally receiving the end of conductor 13, and the parts are so dimensioned that when nut 37 is drawn tight conductor 13 is well within tube 112 and insulator sleeves 65 and 15 abut. Nut 37 and ring 70 are placed on body 93 prior to telescoping the body and panel fitting together.

As shown in Fig. 14, a duplicate coupling assembly may be employed at each end of fitting 57.

In Fig. 17 another form of coupling is illustrated between the rigid coaxial terminal of a wavemeter or like resonator chamber 113 and flexible line 11. The coupling body comprises telescoped cylindrical inner and outer tubular metal members 114 and 115. Outer member 115 is internally shouldered at 116 for seating an insulating or dielectric disc 117, and at 118 for seating inner member 114. Inner member 114 is formed with an external inclined shoulder over which the adjacent end of outer member 115 is turned inwardly as shown at 119. This arrangement solidly holds these members together as a substantially rigid body unit and maintains disc 117 against movement relative thereto.

Beyond inturned flange 119, inner member 114 is formed with a reduced diameter end portion 121 fitting between insulator sleeve 15 and braided conductor 14. A cylindrical clamp thimble 122 has a thin cylindrical end portion inserted between braid 14 and outer insulation 16. Thimble 122 is formed with an external radial flange 123, and beyond flange 123 with an annular groove 124 and an inclined annular face 125 in order.

The adjacent end of outer conductor braid 14 extends between opposed narrow inclined clamp faces 120 and 120' on extension 121 and thimble 122, and if turned outwardly between flange 119 and the adjacent end of thimble 122. Braid 14 is thereby clamped between thimble 122 and the coupling body at clamp faces 120, 120' which are tapered the same as faces 18 and 49 in Fig. 6, and between the inner end of thimble 122 and flange 119. This connection is made solid and permanent by flowing solder onto the exposed end of braid 14. The solder sweats into the joint and permeates a considerable distance from the external end of braid 14 into the clamped braid section, thereby affording a mechanically strong and electrically efficient bond between outer conductor 14 and the coupling body.

An externally threaded rotatable collar 126 is rotatably mounted on outer member 115. A ring 127 soldered to outer member 115 prevents separation of collar 126 from the body member, but permits sliding of collar 126 along the body member so as to permit the above-described soldering operation. A holding member 128 threadedly connected to collar 126 is formed internally with a shoulder 129 having a rounded pressure rim 131.

Flange 123, groove 124 and shoulder 129 define an expansion space for receiving and shaping the end of insulation 16 which flows under compression as the coupling parts are drawn together.

As illustrated, insulation 16 abuts firmly against the disc 117 so that no air gap exists therebetween. It is desirable that the melting point of disc 117 be sufficiently high to avoid softening when soldering is done in the coupling.

Opposite the flexible line end, the coupling is externally formed with a flange 133 for retaining a rotatable and slidable nut 134 adapted to threadedly fit with the projecting rigid outer conductor 135 from chamber 113. Body member 115 telescopes within conductor 135, and a resilient washer 136 provides a water and gas tight seal when nut 134 is drawn tight.

Inner conductor 13 telescopes within a hollow metal tube 137 which is rigidly fastened to disc 117 as illustrated. In practice, I provide inner and outer coatings of solder for tube 137 and the exposed end of conductor 13, so that application of a hot iron will solder them together when assembled as shown, thus providing a strong mechanical and efficient electrical bond.

When the coupling is attached to such a rigid fitting as is shown in Fig. 17, the end of tube 137 telescopes frictionally into the tubular outer end 138 of a rigid center conductor 139 which forms an antenna loop within the resonant chamber.

With reference to Fig. 18, which demonstrates the assembly of the coupling with a flexible line under field conditions, only three separate parts must be handled during assembly, thus reducing complexity and danger of loss. One such part comprises holding member 128, the second is thimble 122, and the third comprises a factory assembly of the remaining elements of the coupling. This factory assembled part comprises members 114 and 115 held together with disc 117 by spinning over flange 119, tube 137 rigid with disc 117, and nut 134 and collar 126 mounted as shown on the body member.

During attachment of the coupling in the field, holding member 128 is first slipped over the cable end as shown in Fig. 18 and then thimble 122 is inserted between the braid and insulation as illustrated. Then, the various conductor and insulations of the cable having been cut to size, the end of bared insulation 15 is thrust into the factory assembled part, with conductor 13 extending through tube 137 and extension 121 entering between braid 14 and sleeve 15. With collar 126 held back is illustrated, the end of braid 14 is available for soldering as above described. Then holding member 128 is advanced into threaded engagement with collar 126, the latter being rotated to draw the coupling tight.

As the coupling is drawn tight, flexible insulation 16 extends and flows into the expansion space, there being molded to provide a locking bead resisting axial pull on the cable. This bead formation is accentuated by groove 124. It is important to note that member 128 is held stationary as the coupling is drawn tight, so that there is no twisting of insulation 16 during the union. Flange 123 acts like flange 52 in Fig. 6 to prevent insulation from interfering with the threaded connection between the body and holding member 128.

The final operations comprise applying a hot iron to extended conductor 13 to solder tinned tube 137 to conductor 13, and then clipping off the exposed end of conductor 13 even with tube 137. The coupling is then complete and ready for use, as in Fig. 17. Observing the above precautions, I prevent any undesirable changes in line impedance due to abrupt changes in conductor diameter ratios at the coupling and provide a coupling which in that respect is substantially as efficient as a continuation of either line.

In Fig. 19, two flexible lines are indicated as attached together by a hollow metal through panel fitting formed at each end similarly to rigid outer conductor 135 of Fig. 17 for attachment to couplings of the above-described type. Tube 141 is relatively short, and the inner conductor is projected therethrough by means of a longitudinally split sleeve 142 which telescopes at opposite ends with tubes 137 of the respective couplings.

Sleeve 142 is formed near one end with a detent 143 adapted to snap into a depression 144 on tube 137 of one coupling. In assembly, sleeve 142 is mounted on a tube 137 prior to bringing that coupling and fitting 141 together. Then the tube 137 of the other coupling slips frictionally into sleeve 142 when that coupling is attached. This construction can be employed for cable splices, and repairs as well as for through-panel fittings.

The assembly of Fig. 20 is similar to that of Fig. 17, but comprises five coupling parts to be handled in the field. Here the members 114 and 115, and disc 117 with tube 137 attached, are separate members instead of being included in a factory assembly as in Fig. 17. This arrangement may be useful where different types of center conductor terminals may be desired. In this assembly, it will be noted, members 114 and 115 are not held together by the spun flange 119 of Fig. 17 so that, when collar 126 and holding member 128 are uncoupled, inner member 114 may be withdrawn from outer member 115 to dismantle the coupling. A ring 145 serves as a solder dam to prevent solder from flowing between members 114 and 115. In this embodiment, in order to prevent rim 131 from compressing the insulation so thin as to weaken it appreciably, or even possibly sever it, I provide a stop formation 132 on flange 123 cooperating with a similar formation on holding member 128 for maintaining a safe spacing between flange 123 and rim 131.

Fig. 21 illustrates an adapter for insuring that the center conductor terminal of the coupling is of a desired size, such as the same diameter as conductor 13. Instead of tube 137, disc 117 has secured thereto a pin 146 having a hollow base for receiving the end of conductor 13 and a projecting tip of the same diameter as conductor 13. If desired, the projecting tip of pin 146 could be omitted and its place taken by a projection of conductor 13.

Some materials employed in insulation 16 may have cold flow properties which may tend in time to loosen the grip of the coupling on insulation 16. Figure 22 shows an arrangement for avoiding this difficulty. Instead of making the holding member as a single piece of metal as in Fig. 17, it comprises three elements including an outer holding member 128 having an internal radial flange 147. Within flange 147 are located an annular ring 148 of good grade rubber or some other highly elastic material and a metal ring 149 formed with a pressure rim 151.

When the coupling is drawn tight, pressure transmitted through ring 148 causes deformation of ring 148 as illustrated. The elastic properties of ring 148 insure that throughout the life of the coupling a constant force will be active to prevent cold flow of insulation 16 away from the expansion space.

It will be understood that features of the various illustrated embodiments of the invention may be interchanged without departing from the spirit of the invention. While single center conductor coupling arrangements only have been described, the invention is of course equally applicable to couplings and conductors embodying multiple inner conductor arrangements. Further, although the invention is especially adaptable for ultra high frequency transmission lines, it is usable for lower frequency and direct current transmission lines wherein its mechanical advantages are equally valuable.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A coupling for a flexible coaxial conductor line having an inner conductor, an outer conductor, a covering of compressible insulation around said outer conductor, and flexible insulation between said conductors, comprising a coupling body including a portion having a bore of substantially the same diameter as said insulation between said conductors, an annular clamping surface on said portion surrounding the end of said bore, said surface including a tapered portion adapted to project between said flexible insulation and said outer conductor and flare out the end of said outer conductor, a cylindrical thimble adapted to surround part of said outer conductor, one end of said thimble cooperating with said clamping surface to clamp said flared part of said outer conductor, said thimble being tapered at its other end for insertion between said outer conductor and said insulation covering and provided with an outwardly extending flange for abutment with the end of said insulation covering, a holding nut surrounding said line and threaded on said coupling body and provided with an internal shoulder, and means including said shoulder for engaging said insulation covering as said nut is tightened on said coupling body to force said insulation covering against said flange and thereby force said first mentioned thimble end toward said clamping surface for clamping said outer conductor.

2. The invention set forth in claim 1, wherein said means including said shoulder for engaging said insulation covering further includes an insulation clamp collar adapted to surround said covering with one of its ends in engagement with said shoulder, said collar having longitudinal slots at its other end to provide a resilient section capable of circumferential contraction, and an internal annular tapered face on said coupling body adapted to engage the slotted end of said clamp collar to contract said resilient section and form a restricted section gripping and partly imbedded in said insulation covering.

3. The invention set forth in claim 2, wherein said insulation clamp collar surrounds a part of said insulation covering which surrounds said thimble.

4. The invention set forth in claim 1, wherein said thimble is adapted to have said flared end of said outer conductor folded back externally over its end.

5. The invention set forth in claim 1, wherein said annular clamping surface surrounding the end of said bore comprises a concave shoulder facing toward said thimble.

6. The invention set forth in claim 1, wherein said means including said shoulder for engaging said insulation covering further includes a tapered surface on the outside of said thimble for expanding said outer insulation circumferentially to an outer diameter greater than the inner diameter of said shoulder.

7. The invention set forth in claim 6, further including a circumferential groove in the outer surface of said thimble between said tapered surface and said outwardly extending flange, said groove, said flange and said shoulder being adapted to define an expansion space for receiving the end of said insulation covering.

FREDERICK L. SALISBURY.

References Cited in the file of this patent

UNITED STATES PATENTS

| Number | Name | Date |
|---|---|---|
| 1,060,600 | Jamieson | May 6, 1913 |
| 1,497,002 | Sanderson | June 10, 1924 |
| 1,718,817 | Greene | June 25, 1929 |
| 1,896,444 | Fossati | Feb. 7, 1933 |
| 2,152,504 | Scott et al. | Mar. 28, 1939 |
| 2,173,643 | Moser | Sept. 19, 1939 |
| 2,241,687 | Warnke | May 13, 1941 |
| 2,294,432 | Weidner | Sept. 1, 1942 |
| 2,296,766 | Bruno | Sept. 22, 1942 |
| 2,328,111 | Thornbery | Aug. 31, 1943 |
| 2,352,159 | Brodie | June 27, 1944 |
| 2,371,185 | Purat | Mar. 13, 1945 |
| 2,449,983 | Devol | Sept. 28, 1948 |

FOREIGN PATENTS

| Number | Country | Date |
|---|---|---|
| 112,951 | Great Britain | Feb. 7, 1918 |
| 489,510 | Great Britain | July 28, 1939 |